United States Patent
Tyminski

(10) Patent No.: US 10,375,971 B1
(45) Date of Patent: Aug. 13, 2019

(54) CUTTING BOARD AND STORAGE ASSEMBLY

(71) Applicant: Joseph Tyminski, Babylon, NY (US)

(72) Inventor: Joseph Tyminski, Babylon, NY (US)

( * ) Notice: Subject to any disclaimer, the term of this patent is extended or adjusted under 35 U.S.C. 154(b) by 0 days.

(21) Appl. No.: 16/163,041

(22) Filed: Oct. 17, 2018

(51) Int. Cl.
| | |
|---|---|
| *A22C 25/00* | (2006.01) |
| *A22C 25/06* | (2006.01) |
| *A47J 47/00* | (2006.01) |
| *B24B 3/54* | (2006.01) |
| *A01K 97/22* | (2006.01) |
| *A22C 25/18* | (2006.01) |

(52) U.S. Cl.
CPC .............. *A22C 25/06* (2013.01); *A01K 97/22* (2013.01); *A47J 47/005* (2013.01); *B24B 3/54* (2013.01); *A22C 25/185* (2013.01)

(58) Field of Classification Search
CPC .......... A01K 97/00; A22C 25/00; A22C 25/06
USPC .................................. 54/4, 54.1, 55; 452/194
See application file for complete search history.

(56) References Cited

U.S. PATENT DOCUMENTS

| | | | | |
|---|---|---|---|---|
| 4,196,538 A | * | 4/1980 | Crone | A01K 97/00 |
| | | | | 206/315.11 |
| 4,271,624 A | | 6/1981 | Peluso | |
| 5,116,279 A | * | 5/1992 | Perry | A22C 25/06 |
| | | | | 452/194 |
| 5,373,708 A | | 12/1994 | Dumoulin, Jr. | |
| 5,628,681 A | * | 5/1997 | White | A22C 25/06 |
| | | | | 452/194 |
| 5,791,479 A | | 8/1998 | Beres | |
| 6,012,584 A | * | 1/2000 | Dawson | A45C 5/03 |
| | | | | 206/372 |
| 6,142,332 A | | 11/2000 | Ferrara | |
| 6,460,699 B1 | | 10/2002 | McGregor | |
| 6,726,050 B1 | * | 4/2004 | Barentine | A22C 25/06 |
| | | | | 220/23.6 |
| 6,726,552 B2 | * | 4/2004 | Wilczynski | B24D 15/08 |
| | | | | 451/349 |
| 7,229,858 B2 | * | 6/2007 | Kutsuna | G01R 31/2856 |
| | | | | 257/E21.511 |
| 7,258,289 B1 | * | 8/2007 | Butt | A47J 47/005 |
| | | | | 241/100 |
| 7,434,693 B2 | * | 10/2008 | Mosko | A47G 21/14 |
| | | | | 206/553 |
| D796,276 S | | 9/2017 | King | |
| 9,980,613 B2 | * | 5/2018 | Lin | A47J 47/005 |

* cited by examiner

*Primary Examiner* — Richard T Price, Jr.

(57) ABSTRACT

A cutting board and storage assembly being mountable in a boat for filleting fish on the boat includes a box that is mountable in a boat thereby facilitating the box to store objects for fishing. A knife sharpener is coupled to and is positioned within the box to sharpen a knife. A holder is coupled to the outer wall of the box to engage the blade of the knife for storing the knife. A lid is hingedly coupled to the box for closing the box and the lid has a top surface. The top surface defines a cutting board when the lid is closed and a fish, other object, can positioned on the cutting board for filleting or otherwise cutting.

6 Claims, 4 Drawing Sheets

CUTTING BOARD AND STORAGE ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cutting board devices and more particularly pertains to a new cutting board device being mountable in a boat for filleting fish on the boat.

BRIEF SUMMARY OF THE INVENTION

An embodiment of the disclosure meets the needs presented above by generally comprising a box that is mountable in a boat thereby facilitating the box to store objects for fishing. A knife sharpener is coupled to and is positioned within the box to sharpen a knife. A holder is coupled to the outer wall of the box to engage the blade of the knife for storing the knife. A lid is hingedly coupled to the box for closing the box and the lid has a top surface. The top surface defines a cutting board when the lid is closed and a fish, other object, can positioned on the cutting board for filleting or otherwise cutting.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
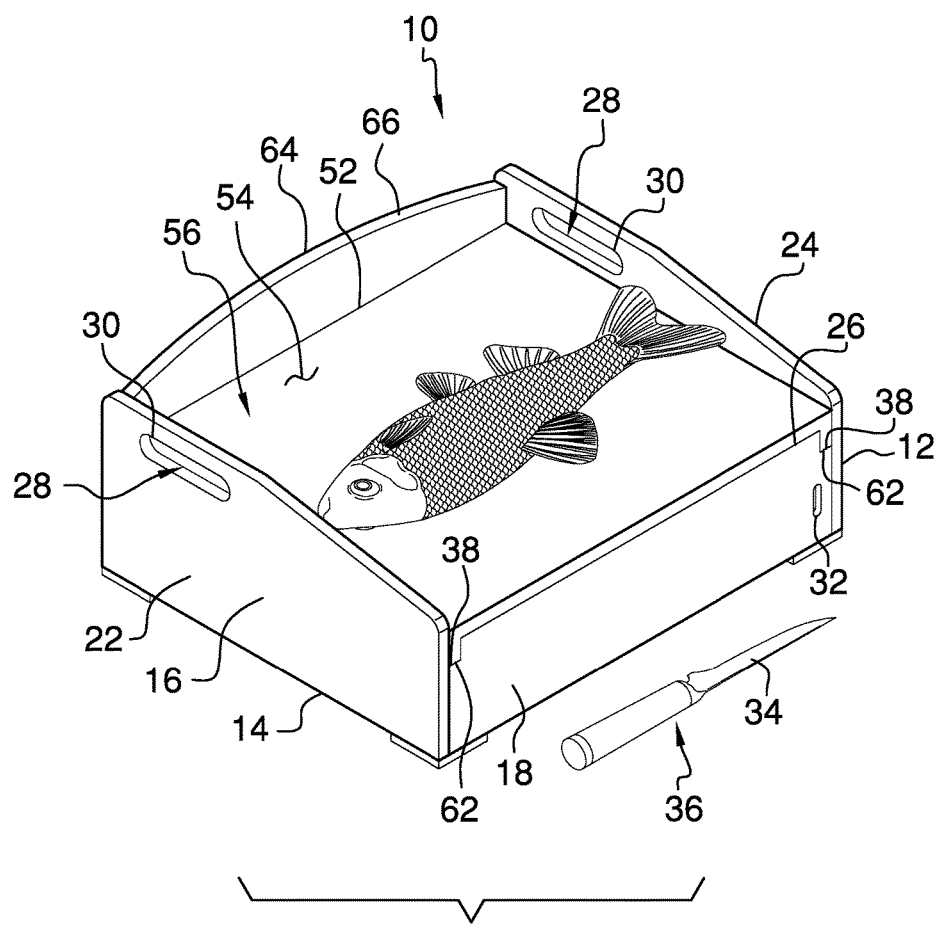
FIG. 1 is a top perspective view of a cutting board and storage assembly according to an embodiment of the disclosure.
Figure 2:
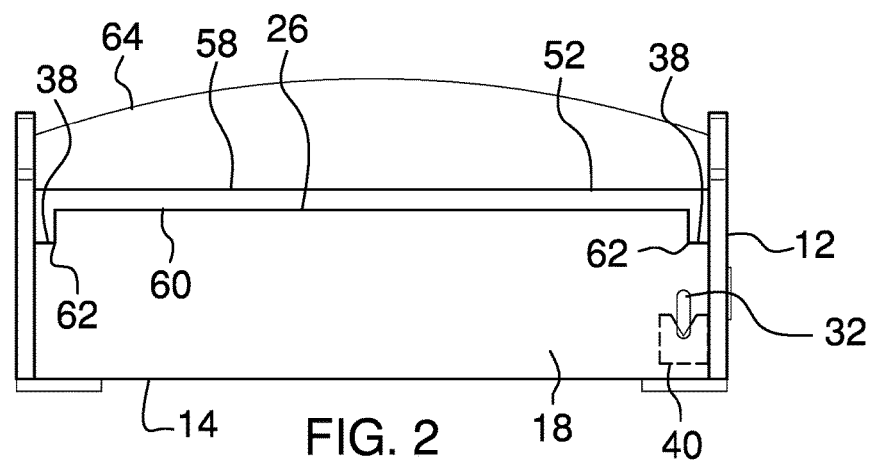
FIG. 2 is a front phantom view of an embodiment of the disclosure.
Figure 3:
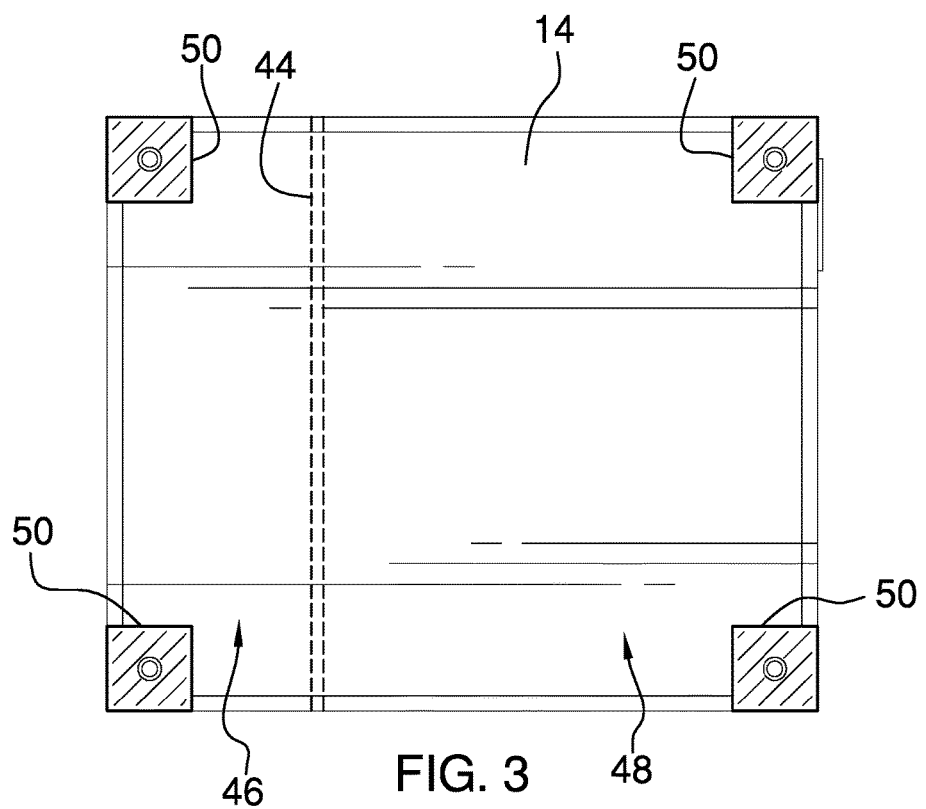
FIG. 3 is a bottom phantom view of an embodiment of the disclosure.
Figure 4:
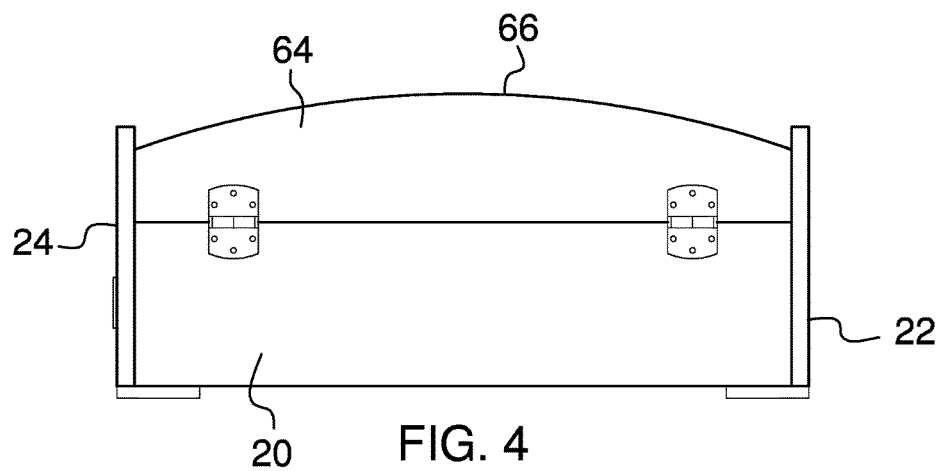
FIG. 4 is a back view of an embodiment of the disclosure.
Figure 5:
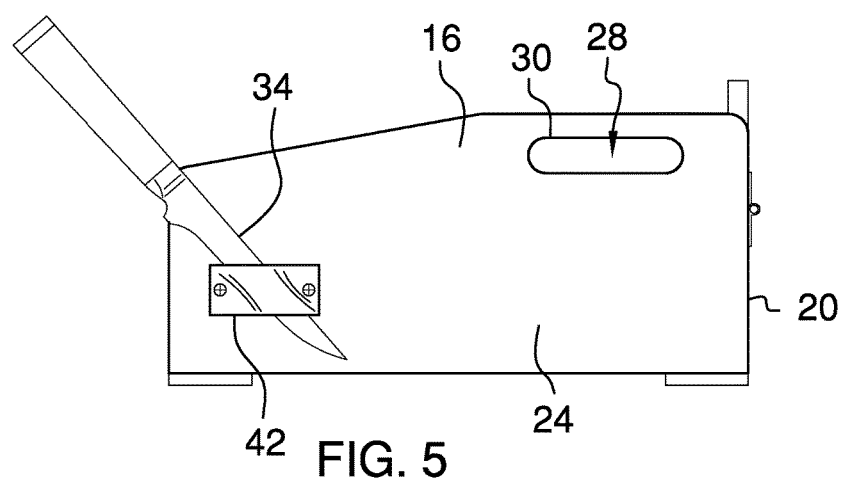
FIG. 5 is a left side view of an embodiment of the disclosure.
Figure 6:
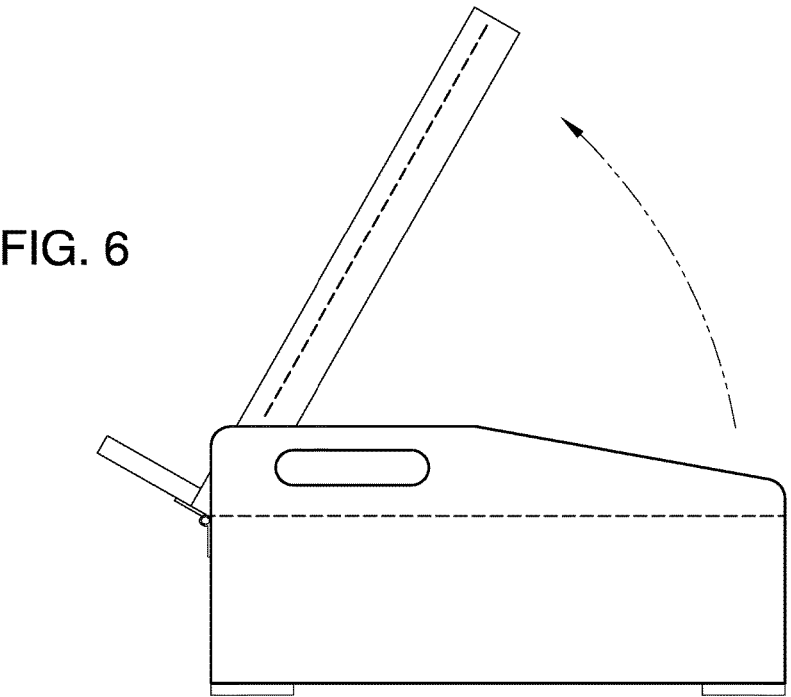
FIG. 6 is a left side phantom view of an embodiment of the disclosure showing a lid in an open position.
Figure 7:
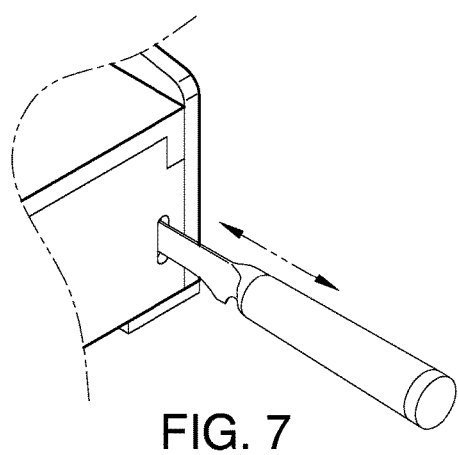
FIG. 7 is a front perspective view of an embodiment of the disclosure showing a knife being extended through a slot in a box.

With reference now to the drawings, and in particular to FIGS. 1 through 7 thereof, a new cutting board device embodying the principles and concepts of an embodiment of the disclosure and generally designated by the reference numeral 10 will be described.

As best illustrated in FIGS. 1 through 7, the cutting board and storage assembly 10 generally comprises a box 12 that is mountable in a boat thereby facilitating the box 12 to store objects for fishing. The boat may be a fishing boat of any conventional design and size. The box 12 has a bottom wall 14 and an outer wall 16 extending upwardly therefrom, and the outer wall 16 has a front side 18, a back side 20, a first lateral side 22 and a second lateral side 24. The front side 18 has a distal edge 26 with respect to the bottom wall 14 and each of the first 22 and second 24 lateral sides has a height is greater than a height of the front 18 and back 20 sides.

Each of the first 22 and second 24 lateral sides has an opening 28 extending therethrough to define a handle 30 on each of the first 22 and second 24 lateral sides. The opening 28 on each of the first 22 and second 24 lateral sides is positioned higher than the distal edge 26 of the front 18 and back 20 sides. Additionally, the opening 28 in each of the first 22 and second 24 lateral sides is horizontally elongated such that the opening 28 in each of the first 22 and second 24 lateral sides has an ovoid shape. The front side 18 has a slot 32 extending into an interior of the box 12 to insertably receive a blade 34 of a knife 36. The front side 18 has a pair of grooves 38 each extending downwardly from the distal edge 26 of the front side 18 toward the bottom wall 14. Moreover, each of the grooves 38 is aligned with a respective one of first 22 and second 24 lateral sides of the outer wall 16 of the box 12.

A knife sharpener 40 is coupled to and is positioned within the box 12 for sharpening the knife 36. The knife sharpener 40 is aligned with the slot 32 in the front side 18 for receiving the blade 34 of the knife 36 when the blade 34 of the knife 36 is extended through the slot 32. The knife sharpener 40 may be an abrasive knife sharpener of any conventional design. A holder 42 is coupled to the outer wall 16 of the box 12 to engage the blade 34 of the knife 36 for storing the knife 36.

A divider 44 is positioned within the box 12 to define a first compartment 46 and a second compartment 48 in the box 12. The divider 44 extends between the front side 18 and the back side 20 of the outer wall 16 of the box 12. A plurality of feet 50 is each of the feet 50 is coupled to and extends downwardly from the bottom wall 14 to abut a support surface. Each of the feet 50 is aligned with a respective one of four corners of the bottom wall 14.

A lid 52 is hingedly coupled to the box 12 for closing the box 12. The lid 52 has a top surface 54 and the top surface 54 defines a cutting board 56 when the lid 52 is closed. In this way the top surface 54 may have a fish, or other object, positioned thereon for filleting or otherwise cutting. The lid 52 comprises a panel 58 that has a bottom surface 60 and the top surface 54, and the panel 58 is hingedly coupled to the back side 20 of the outer wall 16 of the box 12.

A pair of lips 62 is each coupled to and extends downwardly from the bottom surface 60 of the panel 58 and the lips 62 are spaced apart from each other on the panel 58. Each of the lips 62 extends along an entire depth of the panel 58. Each of the lips 62 is positioned in a respective one of the grooves 38 in the front side 18 of the outer wall 16 of the box 12 when the lid 52 is closed. A stop 64 is coupled to and extends upwardly from the top surface 54 of the panel 58 and the stop 64 extending along an entire width of the panel 58. The stop 64 has a top edge 66 and the top edge 66 is concavely arcuate with respect to the top surface 54 of the panel 58.

In use, the box 12 is mounted in the boat at a selected location thereby retaining the box 12 in the boat. The objects are stored within a selected one of the first 46 and second 48 compartments in the box 12. The top surface 54 of the lid 52 defines the cutting board 56 when the lid 52 is closed for filleting or otherwise cutting fish or other objects. The blade 34 of the knife 36 is insertable through the slot 32 in the front side 18 of the outer wall 16 of the box 12 for sharpening the blade 34 in the knife sharpener 40. Additionally, the blade 34 of the knife 36 is insertable into the holder 42 for storage. Ice can be stored in the box 12 and fillets from the fish can be stored in the ice while the boat is on the water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cutting board and storage assembly being configured to be mounted on a boat for storing object and for filleting fish, said assembly comprising:
   a box being mountable in a boat thereby facilitating said box to store objects for fishing, said box having a bottom wall and an outer wall extending upwardly therefrom, said outer wall having a front side, a back side, a first lateral side, a second lateral side, said front side having a distal edge with respect to said bottom wall, each of said first and second lateral sides having a height being greater than a height of said front and back sides, each of said first and second lateral sides having an opening extending therethrough to define a handle on each of said first and second lateral sides, said opening on each of said first and second lateral sides being positioned higher than said distal edge of said front and back sides, said opening in each of said first and second lateral sides being horizontally elongated such that said opening in each of said first and second lateral sides has an ovoid shape, said front side having a slot extending into an interior of said box wherein said slot is configured to insertably receive a blade of a knife, said front side having an inside surface, said front side having a pair of grooves each extending downwardly from said distal edge of said front side toward said bottom wall, each of said grooves being aligned with a respective one of first and second lateral sides of said outer wall of said box;
   a knife sharpener being coupled to and being positioned within said box wherein said knife sharpener is configured to sharpen a knife;
   a holder being coupled to said outer wall of said box wherein said holder is configured to engage the blade of the knife for storing the knife; and
   a lid being hingedly coupled to said box for closing said box, said lid having a top surface, said top surface defining a cutting board when said lid is closed wherein said top surface is configured to have a fish positioned thereon for filleting or otherwise cutting.

2. The assembly according to claim 1, wherein said knife sharpener is aligned with said slot in said front side for receiving the blade of the knife when the blade of the knife is extended through said slot.

3. The assembly according to claim 1, further comprising a divider being positioned within said box to define a first compartment and a second compartment in said box, said divider extending between said front side and said back side of said outer wall of said box.

4. The assembly according to claim 1, wherein said lid comprises:
   a panel having a bottom surface and a top surface, said panel being hingedly coupled to said back side of said outer wall of said box; and
   a pair of lips, each of said lips extending downwardly from said bottom surface of said panel, said lips being spaced apart from each other on said panel, each of said lips being positioned in a respective one of said grooves in said front side of said outer wall of said box when said lid is closed.

5. The assembly according to claim 4, further comprising a stop being coupled to and extending upwardly from said top surface of said panel, said stop extending along an entire width of said panel, said stop having a top edge, said top edge being concavely arcuate with respect to said top surface of said panel.

6. A cutting board and storage assembly being configured to be mounted on a boat for storing object and for filleting fish, said assembly comprising:
- a box being mountable in a boat thereby facilitating said box to store objects for fishing, said box having a bottom wall and an outer wall extending upwardly therefrom, said outer wall having a front side, a back side, a first lateral side, a second lateral side, said front side having a distal edge with respect to said bottom wall, each of said first and second lateral sides having a height being greater than a height of said front and back sides, each of said first and second lateral sides having an opening extending therethrough to define a handle on each of said first and second lateral sides, said opening on each of said first and second lateral sides being positioned higher than said distal edge of said front and back sides, said opening in each of said first and second lateral sides being horizontally elongated such that said opening in each of said first and second lateral sides has an ovoid shape, said front side having a slot extending into an interior of said box wherein said slot is configured to insertably receive a blade of a knife, said front side having an inside surface, said front side having a pair of slots each extending downwardly from said distal edge of said front side toward said bottom wall, each of said slots being aligned with a respective one of first and second lateral sides of said outer wall of said box;
- a knife sharpener being coupled to and being positioned within said box wherein said knife sharpener is configured to sharpen a knife, said knife sharpener being aligned with said slot in said front side for receiving the blade of the knife when the blade of the knife is extended through said slot;
- a holder being coupled to said outer wall of said box wherein said holder is configured to engage the blade of the knife for storing the knife;
- a divider being positioned within said box to define a first compartment and a second compartment in said box, said divider extending between said front side and said back side of said outer wall of said box;
- a plurality of feet, each of said feet being coupled to and extending downwardly from said bottom wall wherein each of said feet is configured to abut a support surface, each of said feet being aligned with a respective one of four corners of said bottom wall;
- a lid being hingedly coupled to said box for closing said box, said lid having a top surface, said top surface defining a cutting board when said lid is closed wherein said top surface is configured to have a fish positioned thereon for filleting or otherwise cutting, said lid comprising:
  - a panel having a bottom surface and a top surface, said panel being hingedly coupled to said back side of said outer wall of said box;
  - a pair of lips, each of said lips extending downwardly from said bottom surface of said panel, said lips being spaced apart from each other on said panel, each of said lips being positioned in a respective one of said grooves in said front side of said outer wall of said box when said lid is closed; and
  - a stop being coupled to and extending upwardly from said top surface of said panel, said stop extending along an entire width of said panel, said stop having a top edge, said top edge being concavely arcuate with respect to said top surface of said panel.

* * * * *